United States Patent [19]

Friedrich et al.

[11] 4,256,882
[45] Mar. 17, 1981

[54] REACTIVE DYESTUFFS

[75] Inventors: Adolf Friedrich, Leverkusen; Horst Harnisch, Cologne; Roderich Raue, Leverkusen, all of Fed. Rep. of Germany

[73] Assignee: Bayer Aktiengesellschaft, Leverkusen, Fed. Rep. of Germany

[21] Appl. No.: 711,142

[22] Filed: Aug. 3, 1976

[30] Foreign Application Priority Data

Aug. 6, 1975 [DE] Fed. Rep. of Germany ....... 2535077

[51] Int. Cl.³ ................. C07D 405/12; C07D 311/82
[52] U.S. Cl. .................................. 544/212; 544/209; 544/322; 544/356; 260/336
[58] Field of Search ................... 260/256.5 R, 336; 544/322, 356, 212, 209

[56] References Cited

U.S. PATENT DOCUMENTS

| | | | |
|---|---|---|---|
| 3,022,316 | 2/1962 | Bestain | 260/335 |
| 3,679,675 | 7/1972 | Tobel | 260/256.5 R |
| 3,878,212 | 4/1975 | Rufer | 260/256.5 R |
| 3,956,300 | 5/1976 | Austin | 260/256.5 R |
| 3,974,160 | 8/1976 | Seiler | 260/256.5 R |

FOREIGN PATENT DOCUMENTS 47-31407  8/1972  Japan .

OTHER PUBLICATIONS

Venkataraman, "The Chemistry of Synthetic Dyes", vol. VI (Academic Press, 1972).

*Primary Examiner*—Joseph E. Evans
*Assistant Examiner*—Michael Shippen
*Attorney, Agent, or Firm*—Sprung, Felfe, Horn, Lynch & Kramer

[57] ABSTRACT

Reactive dyestuffs which in form of the free acid correspond to the following formula

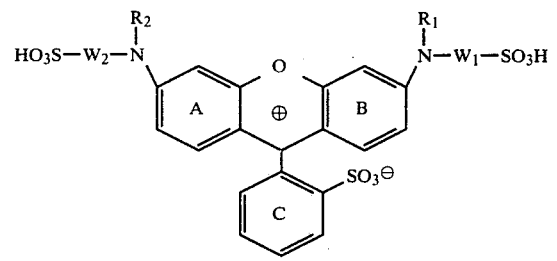

wherein $R_1$, $R_2$, $W_1$, Y, Z, Q, as well as A, B and C have the meaning given in claim 1, and their use for the dyeing and printing of fibre material made of polyamide, for example natural and, in particular, synthetic polyamides, and natural and regenerated cellulose in red and bluish-tinged red fluorescent color.

2 Claims, No Drawings

REACTIVE DYESTUFFS

The invention relates to reactive dyestuffs which, in the form of the free acid, correspond to the formula

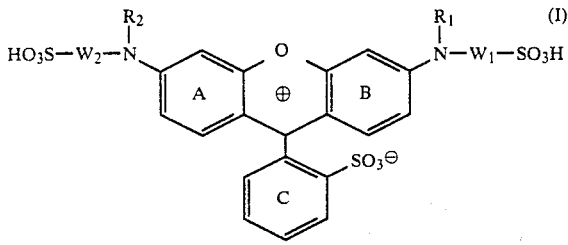

wherein $R_1$ denotes the group

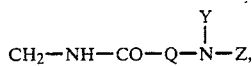

$R_2$ denotes the group

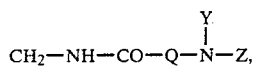

hydrogen or optionally substituted alkyl, cycloalkyl, aralkyl or aryl, $W_1$ and $W_2$ denote a divalent radical, Y represents hydrogen or optionally substituted alkyl, cycloalkyl or aralkyl, Z represents a reactive radical which is free from groups conferring solubility in water and Q represents a divalent radical, and wherein the rings A, B and C can have non-ionic substituents, a process for their preparation and their use for dyeing and printing materials which contain nitrogen and hydroxyl groups, especially fibre materials.

Possible divalent radicals $W_1$ and $W_2$ are, in particular, $C_1$-$C_4$-alkylene, such as methylene, ethylene, propylene or butylene, 5-membered to 6-membered $C_5$-$C_8$-cycloalkylene, such as cyclohexylene, as well as phenylene-$C_1$-$C_3$-alkylene which is optionally substituted in the phenylene radical, for example by methyl, methoxy, ethoxy or chlorine.

Particularly preferred radicals $W_1$ and $W_2$ are $C_2$-$C_4$-alkylene groups.

Suitable alkyl $R_2$ and Y is, for example, $C_1$-$C_4$-alkyl, such as methyl, ethyl, propyl or butyl, which optionally can contain non-ionic substituents, such as chlorine, bromine, cyano or $C_1$-$C_4$-alkoxy, such as methoxy or n-butoxy.

Suitable cycloalkyl $R_2$ and Y contains 5-6 ring members and up to 8 C atoms, such as cyclohexyl and cyclopentyl.

Suitable aralkyl $R_2$ and Y is, for example, phenyl-$C_1$-$C_2$-alkyl such as benzyl or phenethyl, which can be substituted by methyl, ethyl, methoxy, ethoxy, chlorine or bromine.

Suitable aryl $R_2$ is, for example, phenyl which is optionally substituted by methyl, methoxy, chlorine or bromine.

Particularly preferred radicals $R_2$ are hydrogen and $C_1$-$C_3$-alkyl.

Y preferably represents hydrogen, methyl or ethyl.

In particular, $C_1$-$C_4$-alkylene, such as methylene, ethylene, isopropylene or butylene, which can carry further substituents, such as chlorine, bromine, cyclohexyl, benzyl or phenyl, it being possible for phenyl to be further substituted, for example by chlorine, bromine, $C_1$-$C_3$-alkyl, nitro or $C_1$-$C_3$-alkoxy, may be mentioned as a divalent radical Q; furthermore, Q represents, for example, a radical —NH—CO—CH$_2$—, $C_5$-$C_6$-cycloalkylene, phenylene or aralkylene, for example benzylene.

Preferably, Q represents $C_1$-$C_3$-alkylene.

Examples of possible reactive groups Z are the radicals of di- or tri-halogeno-1,3,5-triazines and of di-, tri- or tetra-halogenopyrimidines as well as acyl radicals which carry a substituent which can be split off as an anion and/or carry a multiple bond which is capable of undergoing an addition reaction.

Examples of suitable reactive groups are 2,4-dichloro-triazinyl-6, 2-amino-4-chloro-triazinyl-6, 2-alkylamino-4-chloro-triazinyl-6, 2-dialkylamino-4-chloro-triazinyl-6, 2-alkoxy-4-chloro-triazinyl-6, 2-aryloxy-4-chloro-triazinyl-6, 2,4-dichloro-pyrimidinyl-6, 2,4,5-trichloro-pyrimidinyl-6, 2,4-dichloro-5-nitro- or -5-methyl- or -5-carboxymethyl- or -5-cyano- or -5-vinyl-pyrimidinyl-6, 2,6-dichloropyrimidine-4-carbonyl, 2,4-dichloropyrimidine-5-carbonyl, 2-chloroquinoxaline-3-carbonyl, 2- or 3-monochloroquinoxaline-6-carbonyl, 2- or 3-monochloroquinoxaline-6-sulphonyl, 2,3-dichloroquinoxaline-6-carbonyl and 2,3-dichloroquinoxaline-6-sulphonyl as well as the corresponding bromine and fluorine derivatives of the abovementioned chlorine-substituted heterocyclic radicals, examples amongst these being 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl and 2-fluoro-5-nitro-6-chloro-4-pyrimidinyl. In addition, reactive groups of the aliphatic series may be mentioned, such as acryloyl, mono-, di- or tri-chloro-acryloyl, such as —CO—CH=CH—Cl, —CO—CCl=CH$_2$ and —CO—CCl=CH—CH$_3$, 3-phenylsulphonylpropionyl, vinylsulphonyl, β-chloroethylsulphonyl, 2-fluoro-2-chloro-3,3-difluorocyclobutane-1-carbonyl and 2,2,3,3-tetrafluorocyclobutane-carbonyl-1 or -sulphonyl-1.

The reactive groups derived from the nitrogen-containing heterocyclic compounds are preferred. Amongst these, 2,6-difluoro-5-chloro-4-pyrimidinyl, 2,3-dichloroquinoxaline-6-carbonyl and 2,4-dichlorotriazinyl-6 are particularly preferred.

Non-ionic substituents of the rings A, B and C are understood, for example, as halogen, such as chlorine and bromine, $C_1$-$C_4$-alkyl, $C_1$-$C_4$-alkoxy, nitro, cyano, $C_1$-$C_4$-alkoxycarbonyl and also phenyl and benzyl which are optionally substituted by methyl, chlorine or methoxy.

Preferred reactive dyestuffs within the formula (I) correspond, in the form of the free acid, to the formula

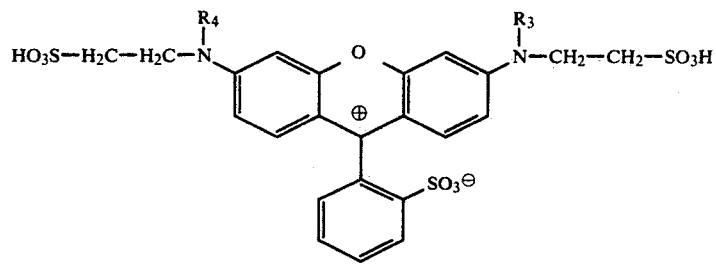 (II)

wherein
R₃ denotes the grouping

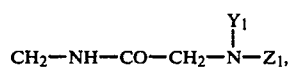

R₄ denotes the grouping

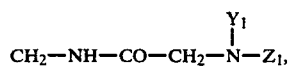

hydrogen, methyl, ethyl or butyl,
$Y_1$ denotes hydrogen, methyl or ethyl and
$Z_1$ denotes 2,4-difluoro-5-chloropyrimidinyl, 2,3-dichloroquinoxaline-6-carbonyl or 2,4-dichlorotriazinyl.

The compounds (I) according to the invention are . . . by reacting compounds of the formula

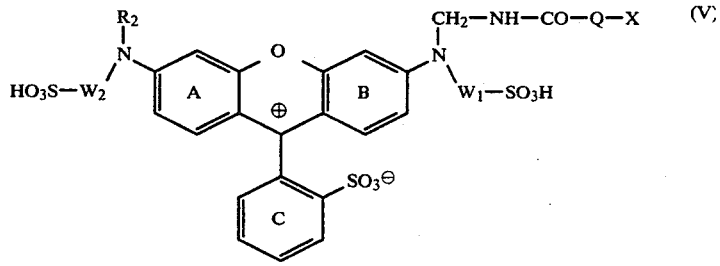 (III)

wherein $W_1$, $W_2$ and $R_2$ have the abovementioned meanings, with N-methylol compounds of the formula $$HO-CH_2-NH-CO-Q-X \qquad (IV)$$

wherein
X represents a halogen atom and
Q has the abovementioned meanings, reacting the intermediate products of the formula

 (V)

wherein $W_1$, $W_2$, Q and $R_2$ have the abovementioned meanings, with primary amines or ammonia and reacting the resulting compounds of the formula

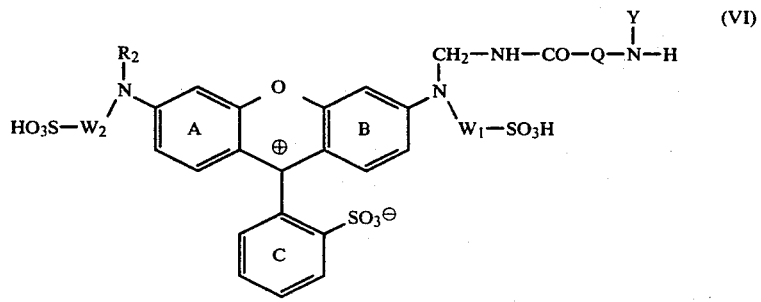 (VI)

with a compound V - Z,
in which
Z has the abovementioned meaning and
V represents a group which can be split off, for example a halogen atom, such as fluorine, chlorine or bromine.

In the case where $R_2$ in formula (III) denotes hydrogen, it is also possible, by reaction with a corresponding amount of the N-methylol compounds (IV), to obtain those compounds which correspond to the formula (I) and in which $R_2=R_1$.

The compounds of the formula (III) are obtained according to methods which are in themselves known from the corresponding 3,6-dichloro-xanthylium compounds.

The N-methylol compounds (IV) used as reactants for the preparation of the dyestuffs (I) are obtained under mild conditions by an addition reaction of formaldehyde with halogenocarboxylic acid amides in the presence of basic or acid condensing agents, such as potassium carbonate or mineral acids. In the present case, for example, the N-methylol compounds of the following halogenocarboxylic acid amides can be used: monochloroacetamide, monobromoacetamide, α-chloro- or α-bromo-propionic acid amide and α,β-dichloro- or α,β-dibromo-propionic acid amide.

N-Methylolchloroacetamide and N-methylol-α,β-dibromo-propionic acid amide are the preferred reactants because of the ready accessibility and good properties of the end products prepared therefrom.

The condensation of the compounds (III) with the N-methylol compounds is carried out in the presence of acid condensing agents, such as concentrated hydrochloric acid, zinc chloride, phosphorus pentoxide, acetic anhydride, syrupy phosphoric acid and oleum. A preferred condensing agent is concentrated to anhydrous sulphuric acid.

The reaction temperature can vary within wide limits and depends, above all, on the condensing agent used. In concentrated sulphuric acid, the reaction usually proceeds rapidly and completely even below room temperature. In some cases it is necessary to work at elevated temperature, for example at 40° to 80° C. The reaction products are isolated in the customary manner by adding ice water to the sulphuric acid solutions.

In some cases, the process according to the invention can be simplified by reacting a mixture of the compound (III) with formaldehyde and the halogenocarboxylic acid amide in a one-pot process, instead of starting from the prepared methylol derivatives of the amides.

The compounds (III) are prepared according to methods which are in themselves known by simultaneous or stepwise substitution of the chlorine atoms in the corresponding 3,6-dichloroxanthylium compounds by means of corresponding amino-sulphonic acids, for example by means of taurine, N-methyltaurine, N-ethyltaurine, N-propyltaurine, N-butyltaurine, N-benzyltaurine, N-phenyltaurine, N-cyclohexyltaurine, 3-amino-propane-1-sulphonic acid, 4-amino-butane-1-sulphonic acid, 3-amino-butane-1-sulphonic acid or 4-(N-benzylamino)-butane-1-sulphonic acid; taurine and N-alkyl-taurines and N-benzyltaurines are particularly preferred.

The reaction of (V) with ammonia or primary amines can be carried out with or without a solvent, in a closed container under pressure or in an open system at temperatures of 20°-80° C.; preferably, aqueous solutions are used at temperatures between 20° and 50° C.

Examples of primary amines which may be mentioned are methylamine, ethylamine, propylamine, butylamine, cyclohexylamine, benzylamine and phenethylamine. Ammonia and $C_1$–$C_3$-alkylamines are particularly preferred.

The reaction of the intermediate product (VI) with the component which forms the reactive radical Z is carried out according to methods which are in themselves known, preferably in aqueous solution at pH values between 2 and 11 and at temperatures between 0° and 45° C.

The dyestuffs according to the invention, which can also be used in the form of their salts, for example the alkali metal salts, the lithium, sodium or potassium salts, the ammonium salts or alkylammonium salts, are suitable for dyeing and printing fibres made of polyamides, for example natural and, in particular, synthetic polyamides, and natural and regenerated cellulose in red and bluish-tinged red fluorescent colour shades.

Because of their surprisingly good solubility, a particularly preferred use of the dyestuffs according to the invention is for printing cotton. The dyestuffs possess outstanding fastness to wet processing, coupled with a high degree of fixation.

EXAMPLE 1

1,526 g of a 21.2% strength aqueous taurine solution are added dropwise to a suspension of 810 g of 3,6-dichloro-9-phenyl-xanthylium 2'-sulphonate in 1 l of water at 18°-22° C. at such a rate that the pH value does not exceed 8.5. The mixture is then stirred for a further 4 hours at room temperature and the intermediate product of the formula

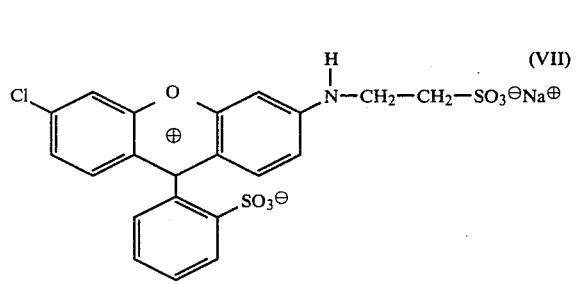

is isolated. It is dried in vacuo at 50° C.

514 g of this intermediate product are suspended in 650 ml of water, the suspension is heated to the boil and aqueous taurine solution is added dropwise in the course of 2 hours at such a rate that a constant pH value of 7 is maintained. As soon as the pH value rises, the reaction has ended. The mixture is then heated under reflux for a further 2 hours. The dyestuff of the formula (VIII) is precipitated from the clear dark red solution by adding sodium chloride; it is dried in vacuo at 50°-60° C.

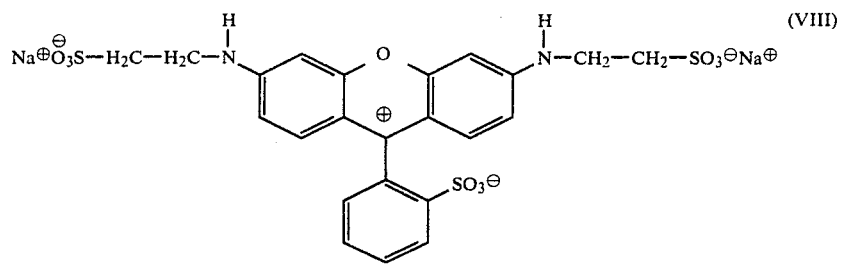

62.5 g of this dyestuff are dissolved in 200 g of concentrated sulphuric acid and a total of 14.8 g of N-methylol-chloroacetamide is added in portions at 10°–15° C. in the course of 4 hours. The mixture is stirred for a further 1 hour at room temperature and discharged onto 600 g of ice and the sulphuric acid is removed by neutralisation with calcium oxide at 20° C. The calcium sulphate is filtered off from the aqueous dyestuff solution. The remaining dyestuff is washed out of the residue with 250 ml of hot water. The combined filtrates are stirred with 100 ml of aqueous 31% strength methylamine solution for 8 hours at 40°–45° C. Subsequently, adding a little sodium hydroxide solution, the excess methylamine and an amount of water such that the reaction volume is about 100 ml are distilled off. The dyestuff solution is treated, at room temperature, with 16.9 g of trifluoro-5-chloro-pyrimidine at a pH value of 5–6 and the mixture is stirred for 1 hour. The reactive dyestuff (IX) is isolated by salting out.

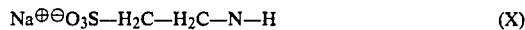

the groups indicated in the table which follows and which dye cotton in the indicated colour shades, are obtained.

| Example | Aminosulphonic acid | Group introduced | Colour Shade |
|---|---|---|---|
| 2 | N-Methyltaurine | —N(CH₃)—CH₂—CH₂—SO₃Na | fluorescent red |
| 3 | N-Butyltaurine | —N(C₄H₉)—CH₂—CH₂—SO₃Na | fluorescent red |
| 4 | N-Benzyl-3-aminopropane-1-sulphonic acid | —N(CH₂—C₆H₅)—CH₂—CH₂—CH₂—SO₃Na | fluorescent bluish-tinged red |

EXAMPLE 5

1,526 g of a 21.2% strength aqueous taurine solution are added dropwise to a suspension of 810 g of 3,6-dichloro-9-phenyl-xanthylium 2′-sulphonate in 1 l of water at room temperature at such a rate that the pH value does not exceed 8.5. The mixture is stirred for a further 2 hours at room temperature and heated to the boil and 1.387 g of the aqueous taurine solution are added dropwise in the course of 1–2 hours at such a rate that the reaction mixture has a constant pH value of 7. The mixture is heated under reflux for a further 5 hours. The dyestuff is precipitated from the clear dark red solution by adding sodium chloride. It corresponds to the formula (VIII) of Example 1. If the further procedure is as described in Example 1, but 29.6 g in place of 14.8 g of N-methylolchloroacetamide are used at a reaction temperature of 20° C., 200 ml in place of 100 ml of the aqueous methylamine solution are used and 33.8 g in place of 16.9 g of trifluoro-5-chloropyrimidine are used, the dyestuff of the formula

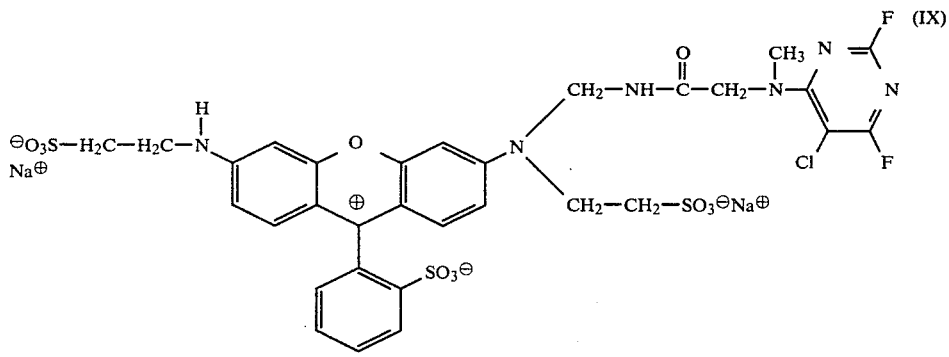

It is particularly suitable for dyeing or printing cotton in a fluorescent yellowish-tinged red colour shade.

If the procedure is as in Example 1, but the intermediate product (VII) is reacted with other aminosulphonic acids instead of with taurine, dyestuffs of the formula (IX) which contain, in place of the group

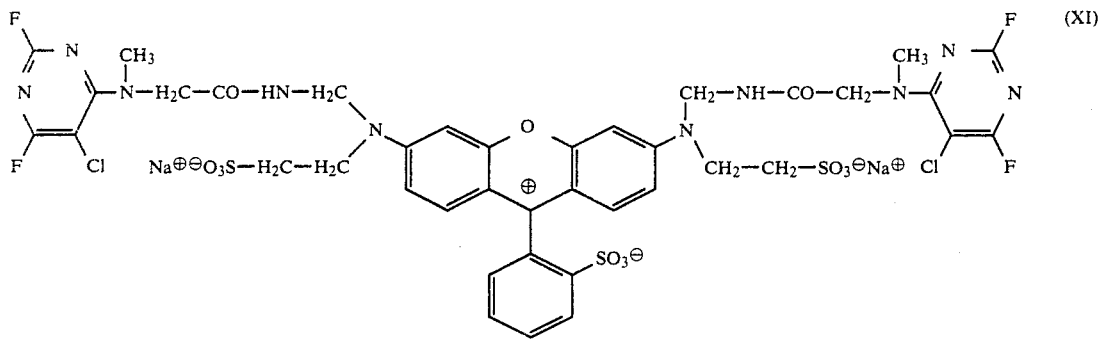

is obtained.

EXAMPLE 6

If the procedure is as described in Example 1, but, in place of the 16.9 g of trifluoro-5-chloropyrimidine, equivalent amounts of 2,3-dichloro-quinoxaline-6-carboxylic acid chloride, 2,3-dichloro-quinoxaline-6-sulphonic acid chloride or 2,4,6-trichlorotriazine are employed, similarly valuable reactive dyestuffs are obtained.

We claim:

1. Reactive dyestuff of the formula

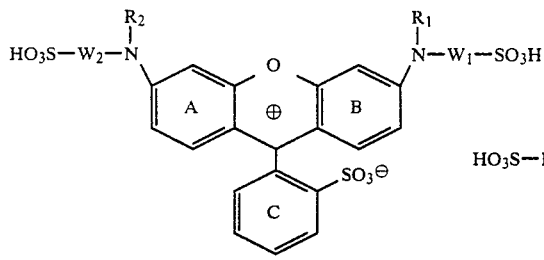

or the alkali or ammonium salt thereof, wherein
$R_1$ is

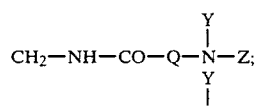

$R_2$ is $CH_2-NH-CO-Q-N-Z$; hydrogen; $C_1-C_4$-alkyl; chloro-$C_1-C_4$-alkyl; bromo-$C_1-C_4$-alkyl; cyano-$C_1-C_4$-alkyl; $C_1-C_4$-alkoxy-$C_1-C_4$-alkyl; cyclohexyl; cyclopentyl; phenyl-$C_1-C_2$-alkyl; phenyl-$C_1-C_2$-alkyl substituted with methyl, ethyl, methoxy, ethoxy, chloro, or bromo; phenyl; or phenyl substituted with methyl, methoxy, chloro, or bromo;

$W_1$ and $W_2$ are $C_2-C_4$-alkylene;

Y is hydrogen, methyl, or ethyl;

Z is a fibre reactive radical reactable with polyamides and cellulose and free from groups conferring solubility in water; and Q is $C_1-C_3$-alkylene.

2. Reactive dyestuff of claim 1 which corresponds to the following formula or its alkali or ammonium salt:

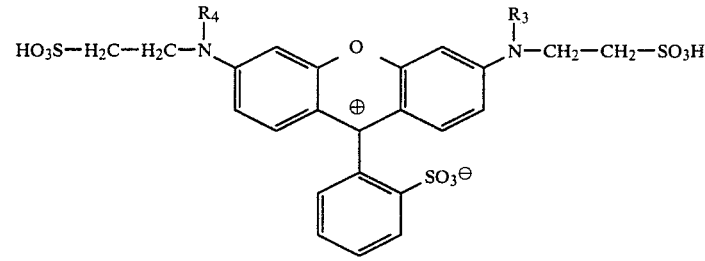

wherein
$R_3$ is

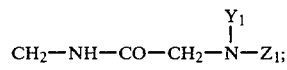

$R_4$ is

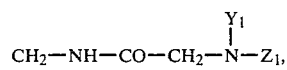

hydrogen, methyl, ethyl, or butyl;
$Y_1$ is hydrogen, methyl, or ethyl, and
$Z_1$ is 2,4-difluoro-5-chloropyrimidinyl, 2,3-dichloroquinoxaline-6-carbonyl, or 2,4-dichlorotriazinyl.

* * * * *